Patented Feb. 22, 1938

2,108,954

UNITED STATES PATENT OFFICE 2,108,954

LUBRICATING COMPOSITION

Jones I. Wasson, Elizabeth, N. J., assignor to Standard Oil Development Company, a corporation of Delaware No Drawing. Application December 20, 1934, Serial No. 758,437

6 Claims. (Cl. 87—9)

The present invention relates to an improved addition agent for lubricating oils and to a method for producing said agent and likewise to a lubricating oil containing the addition agent being adapted for use at high temperature, for example, as a motor oil by reason of its resistance to oxidation, sludge formation and other forms of deterioration. This application contains subject matter disclosed and claimed in my application Serial No. 163,918, filed September 15, 1937. The invention will be fully understood from the following description.

Motor oils and other lubricants which are subjected to elevated temperatures show deterioration by oxidation, sludge formation and the like. Such deterioration may be checked by the addition of certain materials, for example, oxidation inhibitors for reducing the oxidation rate and dispersing agents for preventing or reducing sludge formation. Most of these agents useful for one particular purpose are undesirable from another point of view. For example, most of the oxidation inhibitors raise the Sligh value of an oil. In the present case a new addition agent has been prepared which has the remarkable ability to check all of the various known forms of deterioration and without in any way interfering with or diminishing the value of the oil for lubricating purposes.

The addition agent which forms the principal feature of the present invention is produced from various high boiling aliphatic materials, among which paraffin waxes and heavy paraffin oils may be taken as examples. Fatty acids and esters thereof may also be employed such as the glyceryl or glycol esters, monohydric alkyl esters, alcohols and the like. The above materials are all characterized by long hydrocarbon chains, for example, containing more than 10 carbon atoms.

Such raw materials are first rendered unsaturated either by cracking, dehydrogenation, dehydration or the like and then caused to react with sulfur chloride so as to form a product containing both sulfur and chlorin. The sulfur is believed to be in the form of polysulfide and is corrosive when tested with a bright copper strip in the usual manner, but as will be noted, the subsequent treatment renders the material non-corrosive. The reaction with sulfur chloride is accomplished in the well known way, preferably at ordinary temperatures and with cooling since heat is evolved. The reaction is not permitted to proceed to such a degree as to produce solid materials but is cut short when the product is still liquid and soluble in mineral oils. Ordinarily, the reaction may be accomplished in 1 to 4 hours at a temperature not above about 225° F. and the reaction may be brought to a stop either by a careful control of the amount of sulfur chloride added or by the addition of alcoholic alkali or other such materials which destroy the sulfur chloride.

The intermediate product obtained in the ways outlined above is then steamed, preferably in the presence of alkali so as to remove at least a part of the chlorin and to replace this with hydroxyl groups. This treatment also converts the "corrosive" sulfur to a "non-corrosive" variety so that the final compound will not tarnish copper. The chlorin may be entirely removed but if it is reduced to a small quantity, say less than .5%, results are quite satisfactory. It will be understood that more chlorin than this may be allowed to remain but it is not particularly advantageous, in fact, it is believed to be preferable to remove the chlorin to as complete a degree as possible. The presence of hydroxyl groups is indicated by the acetyl value.

The final product may be purified in any desired manner and in the end consists of an aliphatic hydroxy sulfide or polysulfide soluble in mineral lubricating oils and fluid at ordinary temperatures.

The oils to which the above substance may be advantageously added are high boiling petroleum fractions, particularly the lubricating oils produced by ordinary refining methods such as distillation, acid, alkali, and/or clay treatment or the more highly refined oils such as produced by hydrogenation, destructive hydrogenation, heavy acid treatment or solvent extraction. It has been observed that the more highly refined oils show a greater tendency toward rapid oxidation and this is effectively checked by the addition of relatively small amounts of the agents prepared in the manner described above. The amount may vary considerably with the particular oils but it is usually found that 1% more or less gives satisfactory results.

The addition agents may be added also to high boiling fuels and insulating oils which are subjected to high temperatures.

As an example of the production of the addition agent and its effects, the following may be considered:

Paraffin wax is cracked by heat at 810° F. liquid phase and under 50# pressure to give a total cracked product boiling from about 200 to 650° F. and about 50 to 60% olefine content.

To 100 parts by weight of the cracked wax is added 10 parts by weight of sulfur dichloride and the temperature is held down below 200° F. during the reaction period of about 1 hour. The product recovered is fluid, soluble in mineral oils and contains about 2% by weight of each of the elements chlorin and sulfur.

The intermediate obtained above is then refluxed or steamed over alcoholic soda for one-half hour, dried and finally recovered. It has the following analysis:

| | Per cent |
|---|---|
| Carbon | 82.67 |
| Hydrogen | 14.12 |
| Sulfur | 2.07 |
| Chlorin | 0.35 |
| Total | 99.21 |
| Acetyl value | 51.2 |

To one sample of a well refined S. A. E. 50 grade lubricating oil is added 1% of the above agent and the rate of oxidation is determined and compared with that of a blank sample of the same oil which does not contain the addition agent. The test is made by continuously passing oxygen through a 10 cc. sample of oil at a definite rate while maintaining the sample at 200° C. The oxygen is passed through a closed system and the amount dissolved is determined by difference between the volume originally present and the undissolved oxygen which is measured at 15 minute intervals. The results are as follows:

| Sample | Oxidation rate @ 200° C. cc. $O_2$ absorbed/10 cc. per 15 minutes |
|---|---|
| S. A. E. 50 | 132—116—82—49 |
| Same + 1% hydroxy sulfide | 17—20—15—15 |

The Sligh values of the above samples determined according to the method given in A. S. T. M. Report D–2, p. 22 (1927) except that the time of heating is 24 hours instead of the usual 2½ hours were 6.7 for the blank and 2.2 for the same containing the addition agent.

Another sample of the addition agent was prepared in the same general manner indicated above and when added to a highly refined lubricating oil of high oxidation rate in proportion of 1% showed an oxidation rate of 37—38—28—32. The Sligh value was 1.2, less than 20% of that of the unblended oil.

In the above description, the agent is described as an aliphatic hydroxy sulfide or polysulfide and by this it is meant that the hydroxyl and sulfur groups are attached directly to the aliphatic chain. It is definitely intended to include under this term materials including cyclic aromatic or naphthenic rings, which may or may not be substituted, providing that the sulfur and hydroxyl groups are attached directly to the aliphatic chain as indicated. The oils may be blended with other known materials to increase oiliness, thickeners, metallic soaps, dyes, pour point inhibitors or the like, as in the case of any other mineral oil.

The present invention is not to be limited by any theory of the method by which the agents are produced or any theory of their activity for the purposes disclosed, but only by the following claims in which it is desired to claim all novelty inherent in the invention.

I claim:

1. An improved lubricating composition of low oxidation rate and tendency to sludge, comprising a lubricating oil having a tendency to form sludge on oxidation and containing as an addition agent a small amount of an aliphatic hydroxy-sulfide in which the hydroxy radical and the sulfur are attached directly to the aliphatic group.

2. Composition according to claim 1 in which the addition agent comprises an aliphatic hydroxy polysulfide containing a long carbon chain.

3. Composition according to claim 1 in which the addition agent is a polysulfide containing a carbon chain of at least 10 carbon atoms.

4. Composition according to claim 1 in which the addition agent comprises a polysufide derived from a heavy hydrocarbon.

5. Composition according to claim 1 in which the addition agent comprises a polysulfide derived from paraffin wax.

6. Composition according to claim 1 in which the addition agent comprises a polysulfide derived from an unsaturated derivative of paraffin wax by treatment with sulfur mono or dichloride followed by substitution of hydroxyl groups for substantially all of the chlorin.

JONES I. WASSON.